(12) United States Patent
Martin (10) Patent No.: US 7,770,480 B2
(45) Date of Patent: Aug. 10, 2010

(54) TRANSMISSION SYSTEM (75) Inventor: William Wesley Martin, Milton Keynes (GB)

(73) Assignee: Zeroshift Limited (GB)

( * ) Notice: Subject to any disclaimer, the term of this patent is extended or adjusted under 35 U.S.C. 154(b) by 443 days.

(21) Appl. No.: 10/555,728

(22) PCT Filed: May 7, 2004

(86) PCT No.: PCT/GB2004/001976

§ 371 (c)(1),
(2), (4) Date: Jan. 6, 2006

(87) PCT Pub. No.: WO2004/099654

PCT Pub. Date: Nov. 18, 2004

(65) Prior Publication Data

US 2006/0207362 A1 Sep. 21, 2006

(30) Foreign Application Priority Data

May 7, 2003 (GB) .................................. 0310482.5

(51) Int. Cl.
*F16H 3/08* (2006.01)
(52) U.S. Cl. .................... 74/333; 74/339; 192/48.7; 192/69.81; 192/89.29
(58) Field of Classification Search .................. 74/333, 74/339; 192/48.7, 69.81, 89.29
See application file for complete search history.

(56) References Cited

U.S. PATENT DOCUMENTS 2,314,042 A   3/1943  Haigh
3,327,822 A   6/1967  Spencer
3,780,840 A * 12/1973 Thomas .................... 192/48.91
3,872,737 A *  3/1975 Thomas ........................ 74/339

(Continued)

FOREIGN PATENT DOCUMENTS

DE            607182         12/1934

(Continued)

OTHER PUBLICATIONS

International Search Report dated Sep. 16, 2004.

*Primary Examiner*—David D Le
*Assistant Examiner*—Derek D Knight
(74) *Attorney, Agent, or Firm*—Knobbe, Martens, Olson & Bear, LLP (57) ABSTRACT

A transmission system including first and second rotatable shafts, and means for transferring drive from one of the shafts to the other shaft including first and second gear wheels each rotatably mounted on the first shaft and having drive formations formed thereon, a selector assembly for selectively transmitting torque between the first shaft and the first gear wheel and between the first shaft and the second gear wheel, wherein the selector assembly includes an actuator assembly and first and second sets of engagement members that are moveable into and out of engagement with the first and second gear wheels independently of each other, said selector assembly being arranged such that when a driving force is transmitted, one of the first and second sets of engagement members drivingly engages the engaged gearwheel, and the other set of engagement members is then in an unloaded condition, wherein the actuator assembly is arranged to move the unloaded set of engagement members into driving engagement with the unengaged gear wheel to effect a gear change.

31 Claims, 8 Drawing Sheets

U.S. PATENT DOCUMENTS

| | | |
|---|---|---|
| 3,903,738 A | 9/1975 | Malchow |
| 4,098,380 A * | 7/1978 | Thomas .................... 192/48.5 |
| 4,241,818 A * | 12/1980 | Miller ...................... 192/55.3 |
| 4,274,523 A | 6/1981 | Sigg |
| 4,328,719 A | 5/1982 | Manna |
| 4,592,241 A | 6/1986 | Obayashi et al. |
| 5,679,099 A | 10/1997 | Kato et al. |
| 5,767,420 A | 6/1998 | De Schepper et al. |
| 6,061,619 A | 5/2000 | Schmitz et al. |
| 6,251,043 B1 | 6/2001 | Gierling |
| 6,505,504 B1 | 1/2003 | Chang et al. |
| 6,514,172 B2 | 2/2003 | Kayano et al. |
| 6,899,655 B2 | 5/2005 | Eggert et al. |
| 6,989,289 B1 | 1/2006 | Otto et al. |
| 7,261,379 B2 * | 8/2007 | Volker et al. ................ 297/367 |
| 2002/0134637 A1 | 9/2002 | Salecker et al. |
| 2003/0010144 A1 | 1/2003 | Petzold |
| 2003/0084739 A1 | 5/2003 | Koerber et al. |
| 2003/0171186 A1 | 9/2003 | Okada et al. |

FOREIGN PATENT DOCUMENTS

| | | |
|---|---|---|
| DE | 10037401 | 2/2002 |
| EP | 029711 | 6/1981 |
| EP | 0584457 | 9/1995 |
| EP | 0809049 | 11/1997 |
| EP | 1460305 | 9/2004 |
| FR | 2312693 | 12/1976 |
| FR | 2583489 | 12/1986 |
| FR | 2810713 | 12/2001 |
| GB | 2100812 | 1/1983 |
| GB | 2159897 | 12/1985 |
| GB | 2319817 | 6/1998 |
| GB | 2320531 | 6/1998 |
| WO | WO 03/078198 | 9/2003 |
| WO | WO 2004/099654 | 11/2004 |
| WO | WO 2005/005868 | 1/2005 |
| WO | WO 2005/005869 | 1/2005 |
| WO | WO 2005/024261 | 3/2005 |
| WO | WO 2005/026570 | 3/2005 |

* cited by examiner

Fig. 7

TRANSMISSION SYSTEM

This application is the U.S. National Phase under 35 U.S.C. §371 of International Application PCT/GB2004/001976, filed May 7, 2004, which claims priority of GB 0310482.5, filed May 7, 2003.

The present invention relates to transmission systems and selector mechanisms used in transmission systems to select a gear ratio, and in particular to dog-type transmission systems.

A known dog-type transmission system is described in WO 01/29440. The transmission system disclosed in that document is particularly suited for use in racing vehicles. When changing gear using conventional manual gearboxes there is a torque interruption when a first gear is disengaged and a second gear is selected. In racing vehicles it is necessary to reduce torque interruption time to a minimum thereby maximizing the amount of time an engine drives the vehicle. Torque interruptions lasting tenths of a second between gear changes can have significant impact on a vehicle's performance and hence placing in a race. The transmission system of WO 01/29440 addresses this problem by using dog rings engageable with recess rings attached to first and second gears mounted on an input shaft, and an actuator for moving the dog rings into and out of engagement with the recess rings, such that the first gear is still engaged when the second gear is selected, thereby reducing the torque interruption time to nearly zero.

Conventional gearboxes use synchronising cones to reduce the amount of backlash experienced: however these have the drawback that torque interrupts are relatively long when changing gear. Large torque interrupts affect the efficiency of the vehicle, and in particular lead to increased fuel consumption and higher emissions.

One problem with the invention disclosed in WO 01/29440 is that significant backlash occurs when accelerating or decelerating in a particular gear. The backlash is acceptable to racing drivers since racing drivers are generally more skilled than road users and are more interested in vehicle performance rather than obtaining a smooth ride. Therefore the advantage of reducing the duration of torque interrupts provided by the invention of WO 01/29440 for racing drivers far outweighs the backlash experienced. However, with regards to conventional road vehicles such as cars and motorcycles a smooth ride is a more important criterion and therefore transmission systems with large amounts of backlash are unsuitable for the vast majority of vehicles.

Furthermore, the invention of WO 01/29440 uses a spline configuration that leads to structural weakness and which requires the dog rings to be very strong to prevent them from breaking apart under operating conditions. A further structural weakness is the cantilevered configuration of the recess rings. Also the arrangement of the arcuate recesses formed in the ring causes problems for the dog rings to properly engage with the gear wheels.

The actuator assembly is also bulky leading to large gear boxes.

Other transmission systems have used roller clutches or pawl engagement systems. In the latter case, the pawl mechanism is mounted in a cavity in a shaft. Engagement mechanisms mounted internally in shafts are very complex and difficult to assemble and as such have proved to be commercially unviable.

Accordingly the present invention seeks to provide an improved transmission system that mitigates at least some of the aforementioned problems.

According to one aspect of the present invention there is provided a transmission system including first and second rotatable shafts, and means for transferring drive from one of the shafts to the other shaft including first and second gear wheels each rotatably mounted on the first shaft and having drive formations formed thereon, a selector assembly for selectively transmitting torque between the first shaft and the first gear wheel and between the first shaft and the second gear wheel, wherein the selector assembly includes an actuator assembly and first and second sets of engagement members that are moveable into and out of engagement with the first and second gear wheels independently of each other, said selector assembly being arranged such that when a driving force is transmitted, one of the first and second sets of engagement members drivingly engages the engaged gear wheel, and the other set of engagement members is then in an unloaded condition, wherein the actuator assembly is arranged to move the unloaded set of engagement members into driving engagement with the unengaged gear wheel to effect a gear change.

The transmission system thereby performs accelerating up-shifts and braking down-shifts substantially without torque interruption.

Preferably the first shaft is an input shaft and the second shaft is an output shaft and drive is transferred from the input shaft to the output shaft. Alternatively, the first shaft can be the output shaft and the second shaft is the input shaft.

Preferably the selector assembly is arranged such that when a braking force is transmitted the first set of engagement members drivingly engages the engaged gear wheel, and the second set of engagement members is in an unloaded condition, and when a driving force is transmitted the second set of engagement members drivingly engages the engaged gear wheel, and the second set of engagement members is then in an unloaded condition.

Advantageously the actuator assembly is arranged to bias the loaded set of engagement members towards the unengaged gear wheel without disengaging the loaded set of engagement members from the engaged gear wheel.

Preferably the first and second sets of engagement members are arranged to rotate, in use, with the first shaft. The selector assembly is arranged such that the first and second sets of engagement members can move axially relative to each other along the first shaft. The first and second sets of engagement members are axially aligned when both sets engage the first or second gear wheels, and preferably when in a neutral condition. The first and second sets of engagement members are axially offset during gear change operations.

Preferably the selector assembly is arranged such that when the first and second sets of engagement members engage one of the first and second gear wheels the backlash when moving between acceleration and deceleration is less than or equal to four degrees.

Advantageously the drive formations on the first and second gear wheels comprise first and second groups of dogs respectively. The first and second groups of dogs each comprise between two and eight dogs, evenly distributed on the first and second gears respectively. Preferably the first and second groups of dogs each comprise between two and four dogs, and preferably three dogs.

Preferably the drive formations on the first and second gear wheels do not extend beyond the outer diameter of the gear wheels.

Advantageously the first and second sets of engagement members comprise between two and eight members. Preferably the first and second sets of engagement members comprise between two and four members, and preferably three members.

Advantageously the first shaft includes keyways formed in its curved surface arranged such that the first and second sets of engagement members can slide axially along the keyways and to radially restrain the positions of the sets of engagement members. Preferably the cross-section of the keyways is one of T-shaped, slotted, and dovetailed.

Advantageously the actuator assembly includes at least one resiliently deformable means arranged to move at least one of the first and second sets of engagement members into engagement with the first and second gear wheels when the engagement members are in unloaded conditions. The at least one resiliently deformable means is arranged to bias at least one of the first and second sets of engagement members towards the first or second gear wheel when the engagement members are drivingly engaged with a gear wheel.

Preferably, the actuator assembly includes first and second resiliently deformable means connected to the first and second sets of engagement members respectively such that the first resiliently deformable means acts on the first set engagement members and the second resiliently deformable means acts on the second set engagement members.

In one embodiment the at least one resiliently deformable means is connected to the first and second sets of engagement members such that the resiliently deformable means acts on both the first and second sets of engagement members.

In embodiments including dovetailed or slotted keyways, the members of the first and/or second sets of engagement members can perform limited axial movement relative to each other in the keyways.

Advantageously the resiliently deformable means is a spring, and preferably a disc spring. Preferably the disc spring includes a plurality of arms, each arm having a first part that extends circumferentially around a portion of the disc spring and a second part that extends substantially radially inwards.

Preferably the actuator assembly includes a fork that is arranged to engage the resiliently deformable means to move it axially along the first shaft.

The transmission system may further include third and fourth gears mounted on the first shaft and a second selector assembly to provide additional gear ratios between the first and second shafts.

An embodiment of the present invention will now be described, by way of example only, with reference to the accompanying drawings in which like references indicate equivalent features, wherein.

Figure 1:
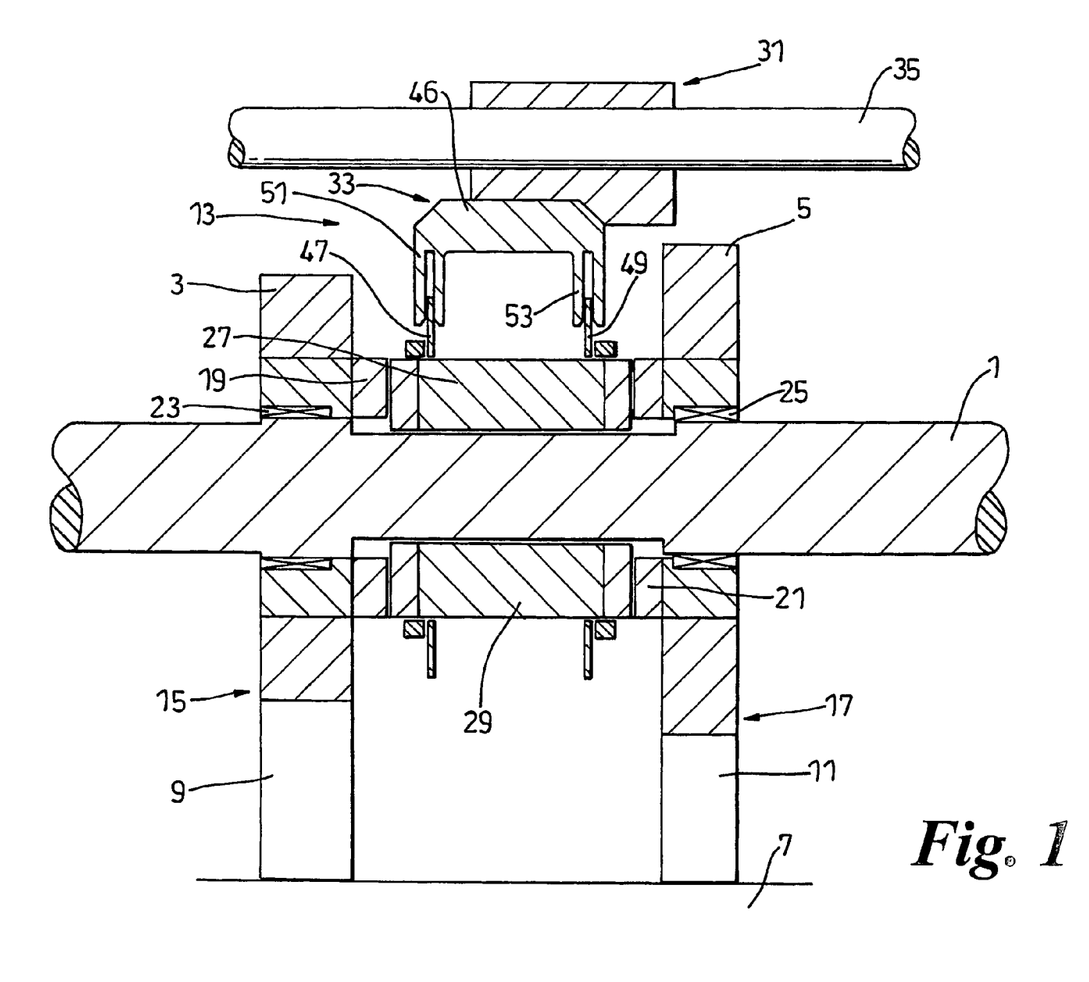
FIG. 1 is a general arrangement of a transmission system in accordance with the present invention.

FIG. 1 shows a transmission system in accordance with the invention. The transmission system comprises an input shaft 1 having first and second gear wheels 3,5 mounted thereon, an output shaft 7 having third and fourth gear wheels 9,11 mounted thereon and a selector assembly 13. The first and second gear wheels 3,5 are rotatably mounted on the input shaft 1 and the third and fourth gear wheels 9,11 are fixedly mounted on the output shaft 7. The first and second gear wheels 3,5 mesh with third and fourth gear wheels 9,11 respectively to form first and second gear wheel pairs 15,17.

Rotational drive may be transferred from the input shaft 1 to the output shaft 7 via either the first or second gear wheel pairs 15,17, with selection of the gear wheel pairs being determined by the position of the selector assembly 13. The selector assembly 13 engages first and second groups of drive formations 19,21 located on the first and second gear wheels 3,5 respectively. The drive formations each comprise groups of dogs.

Figure 3:
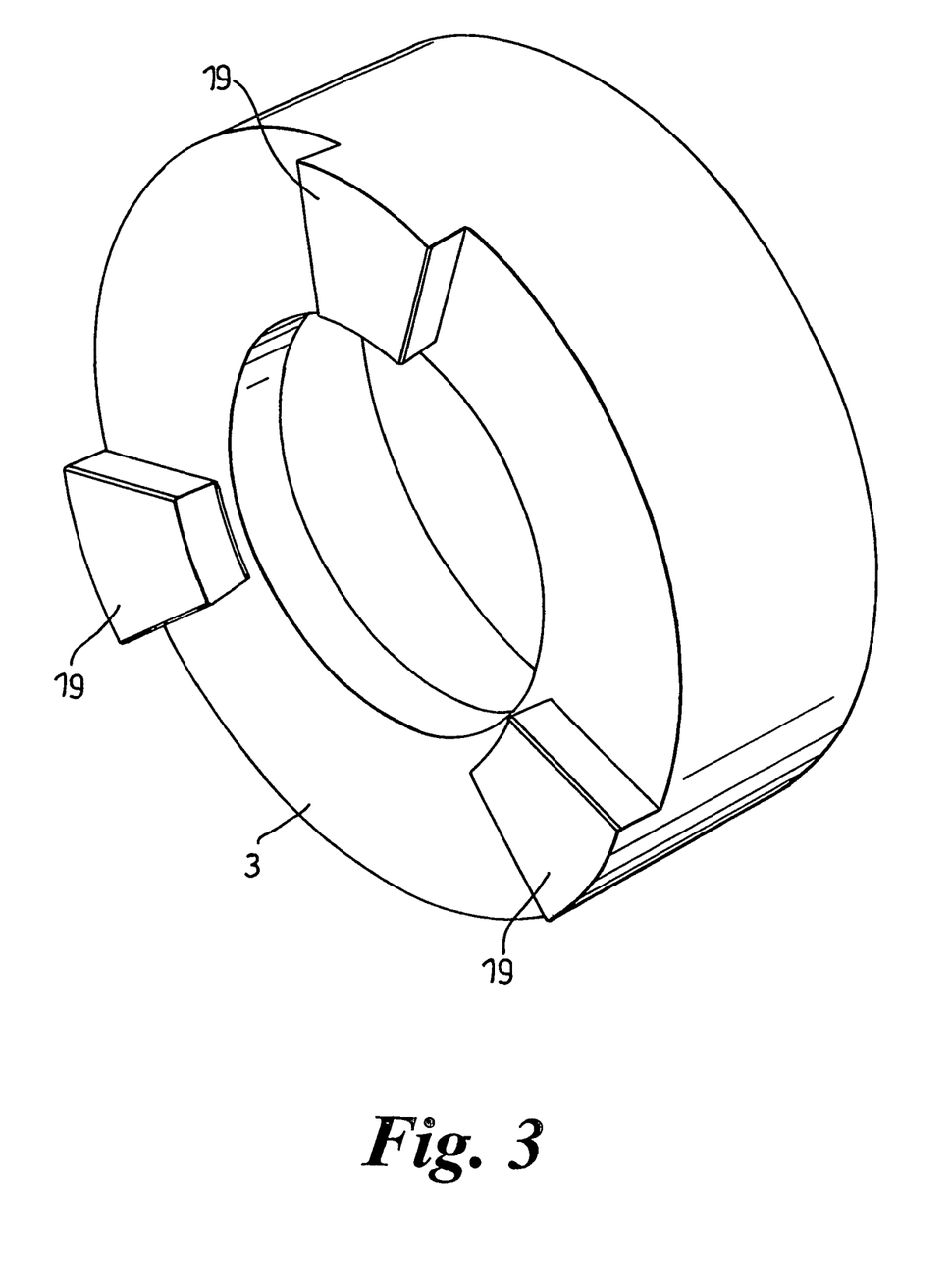
FIG. 3 illustrates the arrangement of a group of dogs on a side of a gear.

The first dog group 19 is located on one side of the first gear wheel 3. The dogs are preferably formed integrally with the first gear wheel, but this is not essential. The first dog group 19 comprises three dogs evenly circumferentially distributed about the gear face, i.e. the angle subtended between the centres of a pair of dogs is approximately 120° (see FIG. 3). The second dog group 21, comprises three dogs and is similarly arranged on one side of the second gear wheel. Three dogs are used because this arrangement provides large engagement windows, that is the spaces between the dogs, to receive the selector assembly 13. Large engagement windows provide greater opportunities for the selector assembly to fully engage the gear wheels 3,5 before transmitting drive thereto. If the selector assembly 13 drives a gear wheel when only partially engaged it can lead to damage of the dogs and/or the selector assembly 13.

The first and second gear wheels 3,5 are mounted spaced apart on the input shaft 1 on roller bearings 23,25 and are arranged such that the sides including the first and second dog groups face each other.

The selector assembly 13 includes first and second sets of engagement bars 27,29 and an actuator assembly 31 in the form of a fork assembly 33 and a selector rod 35.

Figure 2:
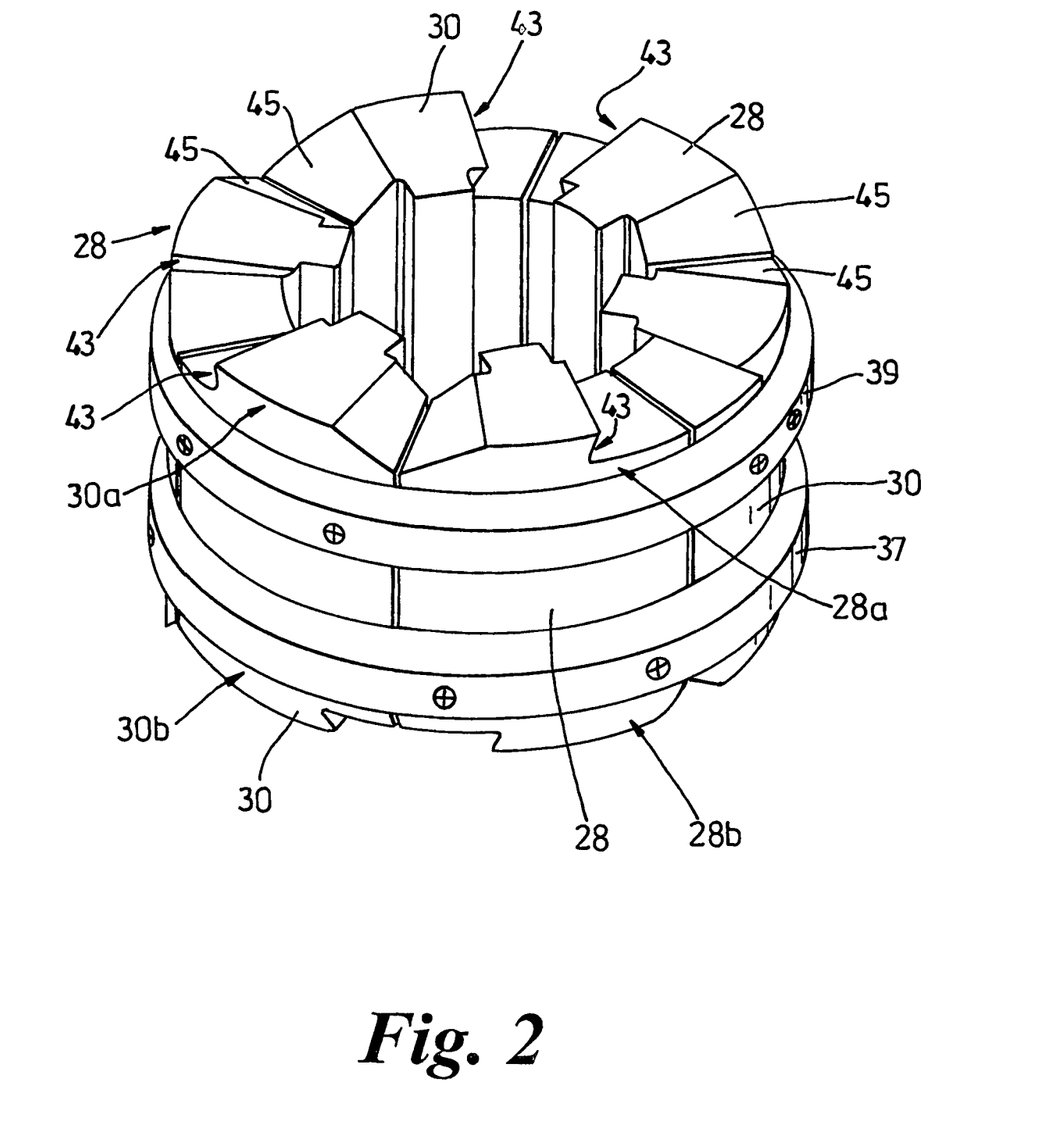
FIG. 2 is a perspective view of part of a selector assembly.

The first and second sets of engagement bars 27,29 are mounted on the input shaft 1 between the first and second gear wheels 3,5. Referring specifically to FIG. 2, the first set of engagement bars 27 comprises three bars 28 attached to a first connector ring, for example using grub screws. The first connector ring 37 holds the bars in a fixed arrangement. The bars 28 are evenly distributed about the inner circumference of the first connector ring such that their bases face inwards, and the bars 28 are arranged substantially parallel. The second set of engagement bars 29 comprises three bars 30 which are held in a similar fixed arrangement by a second connector ring 39.

The first and second engagement bar sets 27,29 are mounted on the input shaft 1 between the first and second gear wheels 3,5. The sets of engagement bars 27,29 are arranged to rotate with the input shaft 1 but are able to slide axially along the shaft in response to a switching action of the actuator assembly 31. To facilitate this, the input shaft 1 includes six keyways 41 formed in its curved surface with each engagement bar 28,30 having a complementary formation in its base. The arrangement of the bar sets 27,29 is such that bars of a particular set are located in alternate keyways 41 and the bar sets 27,29 can slide along the input shaft 1. Each bar set 27,29 moves as a unit and each bar set can move independently of the other. When there is relative movement between the first and second sets of bars 27,29, the second connector ring 39 slides over the first set of bars 27 and the first connector ring 37 slides over the second set of bars 29.

Each bar 28 in the first bar set 27 has a first end 28a arranged to engage the first group of dogs 19 attached to the first gear wheel 3 and a second end 28b arranged to engage the second group of dogs 21 on the second gear wheel 5. The first and second ends 28a,28b typically have the same configuration but are opposite handed, such that the first end 28a is arranged to engage the first group of dogs 19 during deceleration of the first gear wheel 3 and the second end 28b is arranged to engage the second group of dogs 21 during acceleration of the second gear wheel 5, for example during engine braking in automotive applications. Each bar 30 in the second bar set 29 is similarly arranged, except that the first end 30a is arranged to engage the first group of dogs 19 during acceleration of the first gearwheel 3 and the second end 30b is arranged to engage the second group of dogs 21 during deceleration of the second gear wheel 5.

When both the first and second sets of engagement bars 27,29 engage a gear wheel drive is transmitted from the input shaft 1 to the output shaft 7 whether the gear is accelerating or decelerating.

The first and second ends 28a,30a,28b,30b of each bar include a substantially vertical face 43 for engaging dogs 19,21 and a ramp 45 that slopes in the direction of the engagement face 43 to ensure that the bars 28,30 disengage from the dogs 19,21 to prevent the transmission from locking up. When the bars of the first and second sets 27,29 are interleaved, as in FIG. 2, the dog engagement faces 43 of the first end 28a of the first set of bars 27 are adjacent the dog engagement faces 43 of the first end 30a of the second set of bars 29. When the first and second sets of bars 27,29 are fully engaged with a gear a dog is located between each pair of adjacent engagement faces 43. The dimensions of the dogs 19,21 and the ends of the bars are preferably such that there is little movement of a dog between the engagement face 43 of the acceleration bar and the engagement face 43 of the deceleration bar when the gear moves from acceleration to deceleration, or vice versa, to ensure that there is little or no backlash in the gear.

Preferably the bars are configured to be close to the input shaft 1 to prevent significant cantilever effects due to large radial distances of loaded areas thus reducing the potential for structural failure.

Figure 4:
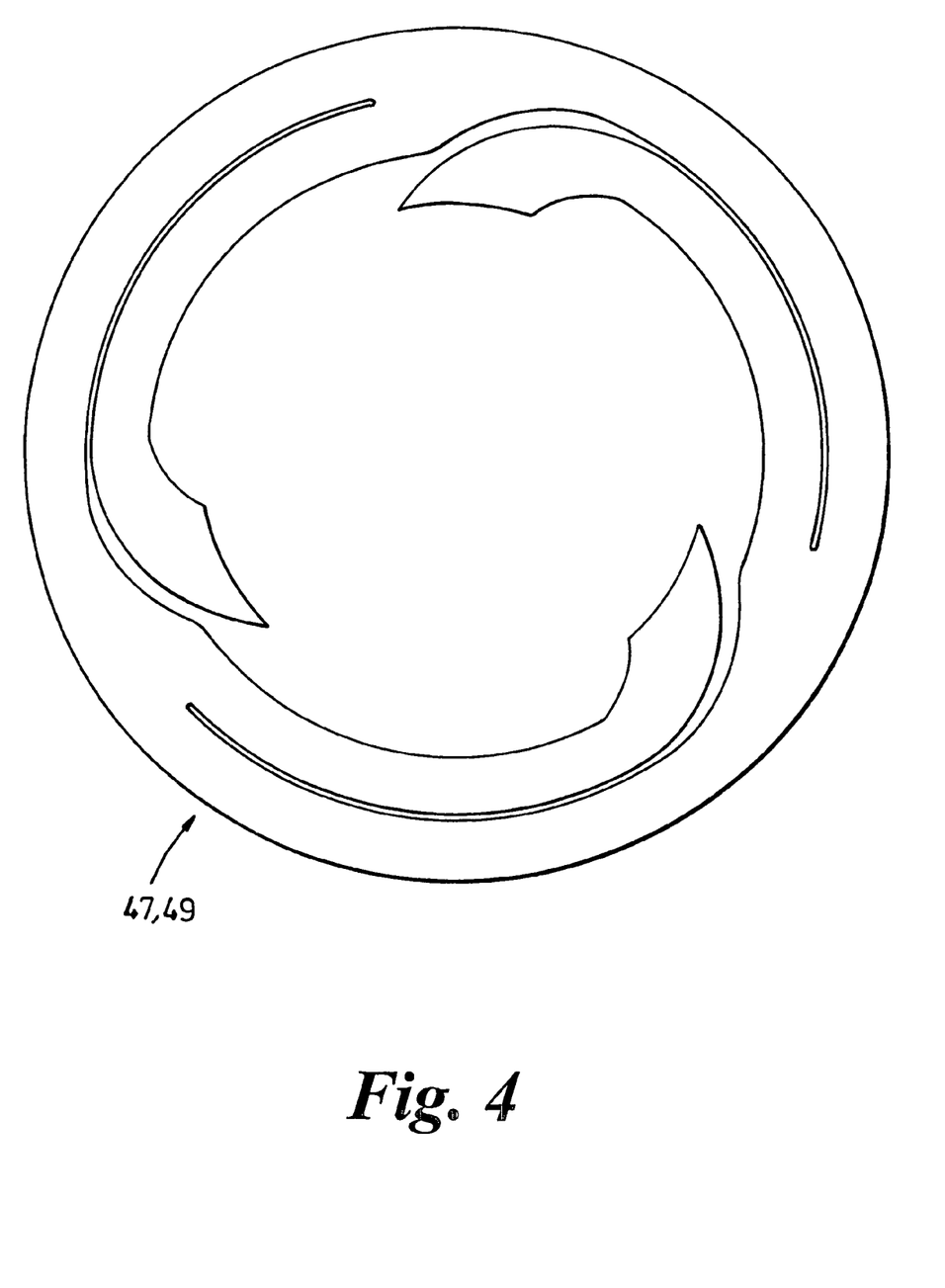
FIG. 4 is a plan of a disc spring.

The actuator assembly 31 is arranged such that the fork assembly 33 is mounted on the selector rod 35, and the selector rod is provided parallel to the input shaft 1 and adjacent thereto. The fork assembly 33 includes a fork 46 and first and second annular disc springs 47,49 mounted about the input shaft 1 (see FIG. 1). The first and second disc springs 47,49 have three arms, with each arm having a first part that extends circumferentially around a part of the spring and a second part that extends radially inwards (see FIG. 4).

The fork 46 has a first pair of arcuate members 51 arranged to engage the first disc spring 47. The arcuate members 51 are arranged such that the first disc spring 47 can rotate with the input shaft 1 between the arcuate members 51 and such that axial movement of the fork 46 parallel to the input shaft 1 moves the arcuate members 51 and hence the first disc spring 47 axially along the shaft if the first disc spring 47 is free to move, or biases the first disc spring 47 to move in the same direction as the fork 46 if the first disc spring 47 is unable to move. The fork 46 has a second pair of arcuate members 53 arranged to engage and act upon the second disc spring 49 in a similar manner.

The position of the fork 46 relative to the first and second gear wheels 3,5 can be adjusted by movement of the selector rod 35 in the axial direction.

The inner edges of the first disc spring 47 are fixed to the bars 28 in the first bar set 27 and the inner edges of the second disc spring 49 are fixed to the bars 30 in the second bar set 29. When the fork 46 moves, thereby moving or loading the disc springs 47,49, the engagement bar sets 27,29 are likewise moved or biassed to move.

The operation of the selector assembly 13 will now be described with reference to FIGS. 5a-5f which for clarity illustrate diagrammatically the movement of the first and second bar sets 27,29 by the relative positions of only one bar from each set.

Figure 5A:
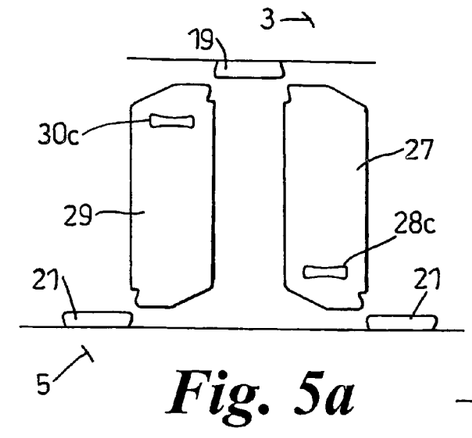
FIGS. 5a-f illustrate diagrammatically operation of the selector assembly.
Figure 5B:
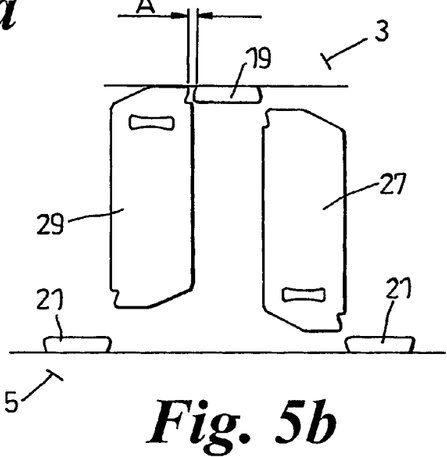

FIG. 5a shows the first and second bar sets 27,29 in a neutral position, that is, neither bar set is engaged with a gear wheel. FIG. 5b shows the first and second bar sets moving into engagement with the first gear wheel 3 under the action of the fork 46.

Figure 5C:
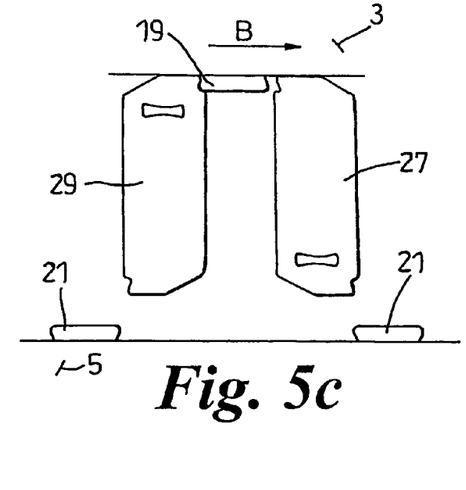
Figure 5D:
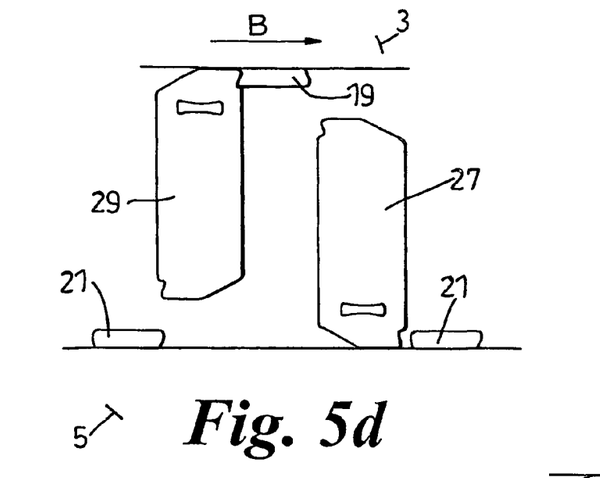

FIG. 5c shows a condition when the first gear wheel 3 is fully engaged, that is, the bars 28,30 are interleaved with the first group of dogs 19. The selector rod 35 is located such that the fork 46 maintains the first and second bar sets 27,29 in engagement with the first gear wheel 3. Accordingly, power is transferred from the input shaft 1, to the first gear wheel 3 by the first bar set 27 when decelerating and the second bar set 29 when accelerating via the first group of dogs 19. Power is transmitted to the output shaft 7 put via the third gear wheel 9.

Whilst accelerating (first gear wheel 3 rotating in the direction of arrow B in FIG. 5c) using the first gear wheel pair 15, the engagement faces 43 of the bars of the first bar set 27 are not loaded, whilst the engagement faces 43 of the bars of the second bar set 29 are loaded. When a user, or an engine management system (not shown) wishes to engage the second gear wheel pair 17, the selector rod 35 is moved such that the fork 46 acts on the first disc spring 47, causing the bars of the first bar set 27 to slide axially along the keyways 41 in the input shaft 1 thereby disengaging the bars from the first gear wheel 3 (see FIG. 5d).

The fork 46 also acts on the second disc spring 49 to bias the bars of the second bar set 29 to move towards the second gear wheel 5. However, because the bars of the second bar set 29 are loaded, i.e. are driving the first gear wheel 3, they cannot be disengaged from the first gear wheel 3, and therefore the bars of the second bar set 29 remain stationary.

Figure 5E:
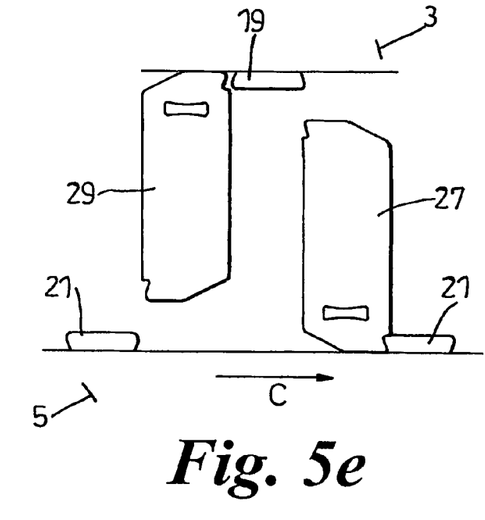
Figure 5F:
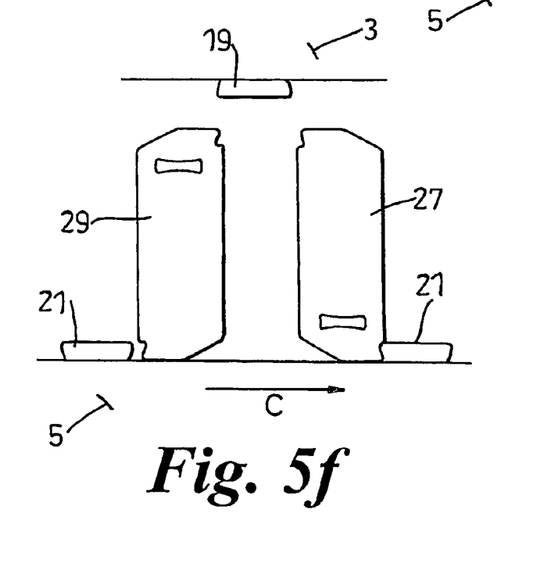
Figure 6:
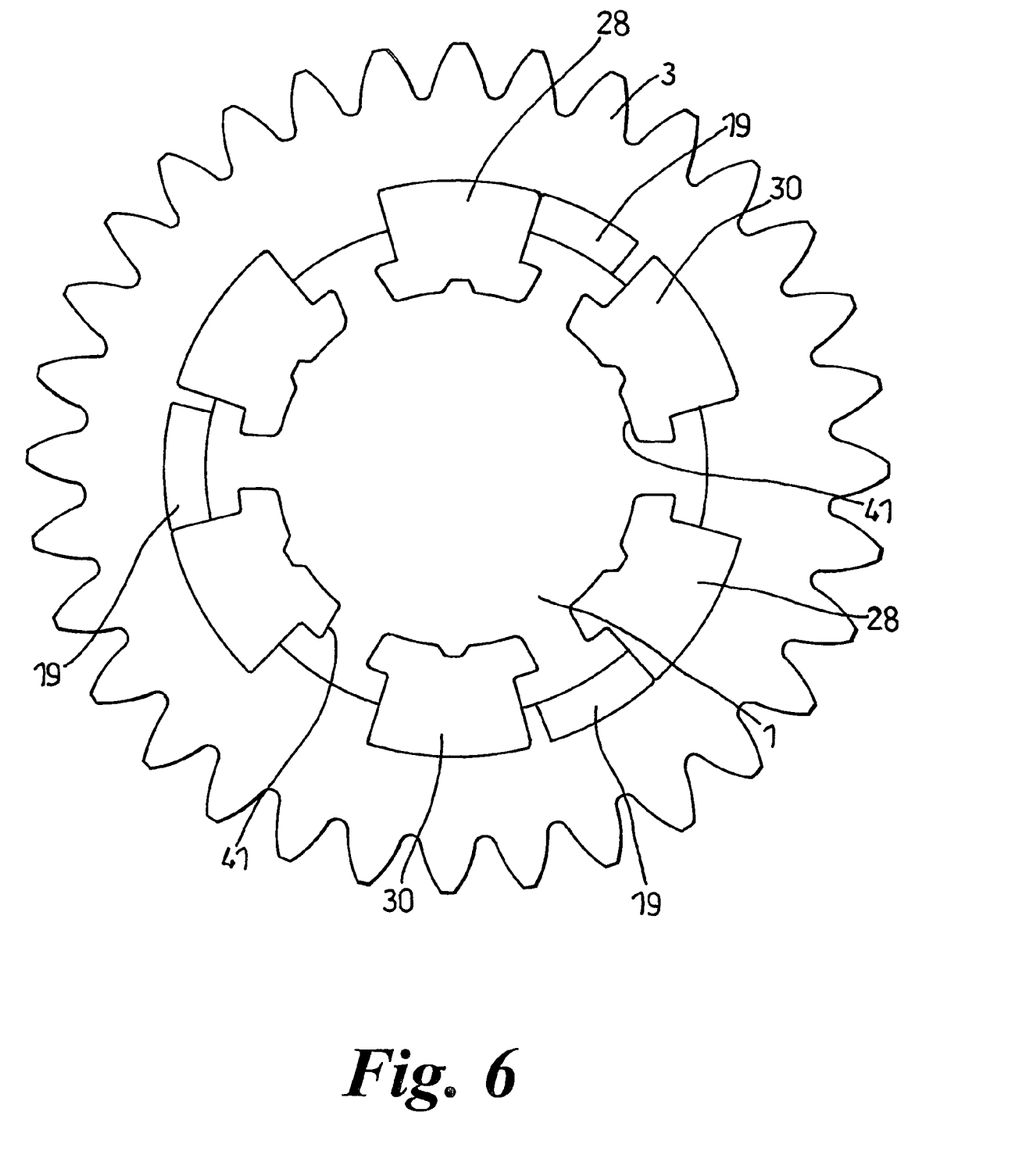
FIG. 6 is a sectional view of an input shaft.

When the bars of the first bar set 27 slide axially along the input shaft 1, the engagement faces 43 engage the second group of dogs 21 (see FIG. 5e). The bars then begin to drive the second gear wheel 5 in the direction of Arrow C in FIG. 5e and energy is transmitted from the input shaft 1 to the output shaft 7 by way of the second gear wheel pair 17. As this occurs, the bars of the second bar set 29 cease to be loaded, and are free to disengage from the first group of dogs 19. Since the second disc spring 49 is biassed by the fork 46, the bars of the second bar set 29 slide axially along the keyways 41 in the input shaft 1 thereby completing the disengagement of the first gear wheel 3 from the input shaft 1. The bars of the second bar set 29 slide along the keyways 41 in the input shaft until they engage the second gear wheel 5, thereby completing engagement of the second gear wheel 5 with the input shaft 1 (see FIG. 5f). This method of selecting gear wheel pairs substantially eliminates torque interruption since the second gear wheel pair 17 is engaged before the first wheel pair 15 is disengaged, thus momentarily, the first and second gear wheel pairs 15,17 are simultaneously engaged.

When a gear wheel is engaged by both the first and second bar sets 27,29 it is possible to accelerate or decelerate using a gear wheel pair with very little backlash occurring when switching between the two conditions. Backlash is the lost motion experienced when the dog moves from the engagement face 43 of the acceleration bar to the engagement face 43 of the deceleration bar when moving from acceleration to deceleration, or vice versa. A conventional dog-type transmission system has approximately 30 degrees of backlash. A typical transmission system for a car in accordance with the current invention has backlash of less than four degrees.

Backlash is reduced by minimising the clearance required between an engagement member and a dog during a gear shift: that is, the clearance between the dog and the following engagement member (see measurement 'A' in FIG. 5b). The clearance between the dog and the following engagement member is in the range 0.5 mm-0.03 mm and is typically less than 0.2 mm. Backlash is also a function of the retention angle, that is, the angle of the engagement face 43, which is the same as the angle of the undercut on the engagement face of the dog. The retention angle influences whether there is relative movement between the dog and the engagement face 43. The smaller the retention angle, the less backlash that is experienced. The retention angle is typically between 2.5 and 15 degrees, and preferably is 15 degrees.

Transition from the second gear wheel pair 17 to the first gear wheel pair 15 whilst decelerating is achieved by a similar process.

Whilst decelerating in the second gear wheel pair 17 the engagement surfaces 43 of the bars of the first bar set 27 are not loaded, whilst the engagement surfaces 43 of the bars of the second bar set 29 are loaded. When a user, or an engine management system (not shown) wishes to engage the first gear wheel pair 15, the selector rod 35 is moved such that the fork 46 slides axially relative to the input shaft 1. The fork 46 acts on the first disc spring 47 attached to the first bar set 27, causing the bars of the first bar set 27 to slide axially in the keyways 41 along the input shaft 1 in the direction of the first gear wheel 3, thereby disengaging the first bar set 27 from the second gear wheel 5.

The fork 5 also acts on the second disc spring 49 but since the bars of the second bar set 29 are loaded, i.e. they are drivingly engaged with the dogs 21 on the second gear wheel, the second bar set 29 remains stationary, however the second disc spring 49 is biassed by the fork 46 to move the second bar set 29 towards the first gear wheel 3.

As the bars of the first bar set 27 slide axially in the keyways 41, the bars 28 engage the dogs 19 on the first gear wheel and begin to drive the first gear wheel 3 such that energy is transmitted from the input shaft 1 to the output shaft 7 by way of the first gear wheel pair 15. As this occurs, the bars of the second bar set 29 cease to be loaded. The second disc spring 49 acts on the bars of the second bar set 29, causing it to slide axially within the keyways 41 along the input shaft 1 towards the first gear wheel 3, thereby completing disengagement of the second gear wheel 5. The second bar set 29 continues to slide within the keyways 41 along the input shaft 1 until it engages the first gear wheel 3, thereby completing engagement of the first gear wheel 3 with the input shaft 1.

Kick-down shifts, that is a gear shift from a higher gear ratio to a larger gear ratio but where acceleration takes place, for example when a vehicle is travelling up a hill and the driver selects a lower gear to accelerate up the hill, have a brief torque interruption to allow disengagement prior to the shift.

A plurality of selector assemblies can be mounted on the input shaft with corresponding pairs of gear wheels to provide a larger number of gear ratios between the output shaft and the input shaft. It is also possible to have transmission systems with more than two shafts to provide additional gear ratios.

Use of the transmission system leads to improved performance, lower fuel consumption and lower emissions since drive interruption has substantially been eliminated. Also the system is a more compact design than conventional gearboxes leading to a reduction in gearbox weight.

The keyways 41 can be formed in a separate component from the input shaft which is then fixedly attached to the input shaft, for example by using a splined arrangement. The keyways 41 preferably have dovetailed profiles such that the bars are radially restrained within the keyways (see FIG. 5). Alternatively, the keyways can have a slotted or T-shaped profile to radially restrain the bars. This provides a significant advantage since it obviates the need for the first and second connector rings 37,39 to connect the bars together in the first and second bar sets. This arrangement is preferred since it provides an improved means of restraining the radial position of the bars 28,30 relative to the input shaft 1, leading to greater structural integrity of the transmission system. Since the connector rings 37,39 are no longer required it is possible to reduce the length of the engagement bars 28,30 thereby producing more compact transmission systems.

Figure 7:
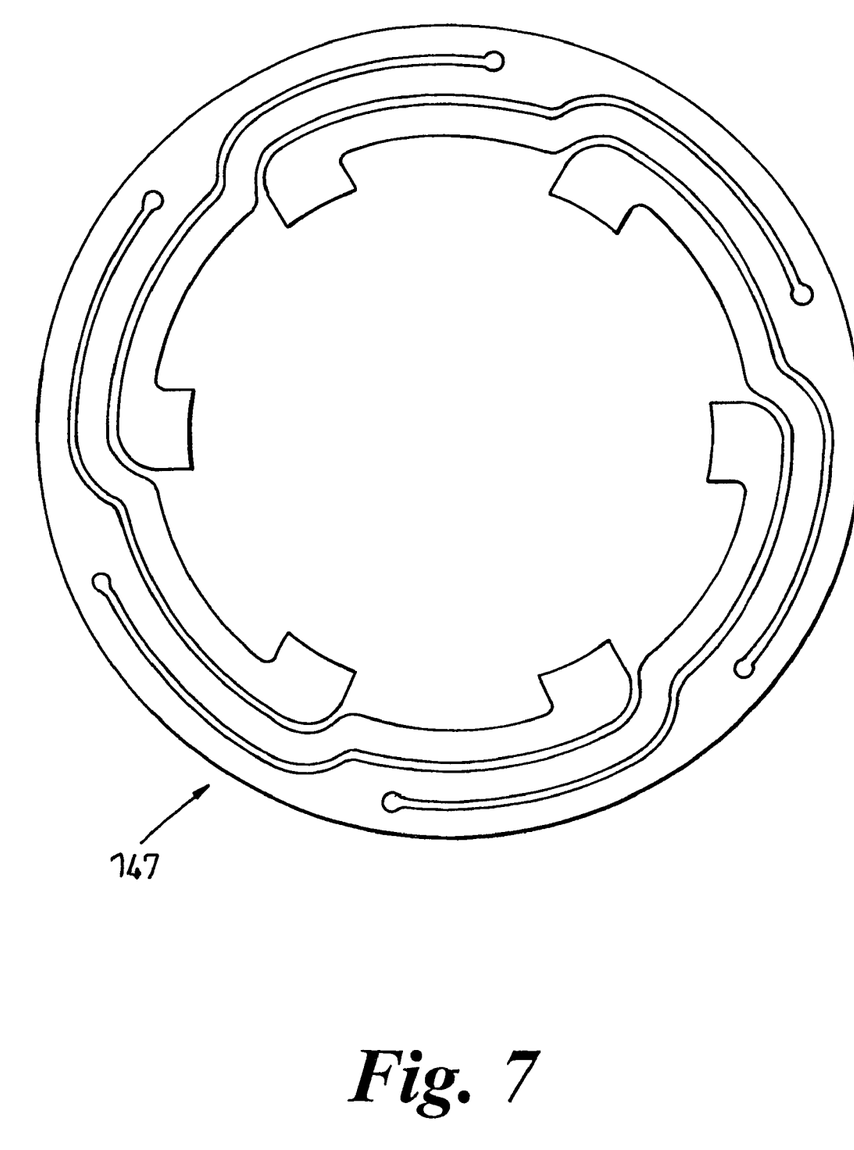
FIG. 7 is a plan view of a disc spring for a second embodiment of the invention.

Furthermore, it allows embodiments of the invention to be used having only one disc spring 147 (see FIG. 7) connecting all six bars together, i.e. bars from the first and second sets, with the actuator arrangement being adapted accordingly. In use, three of the bars would be loaded when the first gear is accelerating and three not loaded, and moving the fork to bias the disc spring towards the second gear will move the three unloaded bars out of engagement with the first gear wheel, leaving three bars still in engagement. Once the bars have engaged with the second gear wheel, the remaining three bars will disengage from the first gear wheel, and under the loading of the disc spring move into engagement with the second gear wheel. This configuration provides a highly compact arrangement leading to smaller, lighter gear boxes. The axial space between the first and second gears to accommodate the selector mechanism may be reduced to around 20 mm for typical road car applications.

FIG. 5a shows a recesses 28c in the top of each bar of the first bar set and a recess 30c in the top of a bar from the second bar set. The recesses 28c,30c allow connections to be made between the bars of the first and second bar sets 27,29 with the arms of the first and second disc springs 47,49 respectively. The shape of the recesses 28c,30c is such that the recesses allow each spring arm to move to a non-perpendicular angle relative to the bars 28,30 during a gear shift.

The recesses 28c,30c shown in FIG. 5a are for a two disc spring configuration. For embodiments having only one disc spring 147 the recesses 28c,30c are located more centrally along the length of the bars 28,30.

When a ring is not used to fix the positions of the bars in a set, the bars in a set can move a small amount relative to each other in the axial direction. This is because the only connection between the bars in a set is provided by a deformable disc spring. A single bar is attached to each disc spring arm and each arm can deform independently of the others, thereby allowing the relative movement between the bars. The bars in a set will nevertheless essentially move in unison.

It will be appreciated by the skilled man that various modifications can be made to the above embodiment that are within the scope of the current invention, for example the number of dogs on each of the gear wheels is not limited to three, for example any practicable number of dogs can be used. It has been found that two to eight dogs are suitable for most applications. Similarly, the number of bars in a bar set can be any practicable number but most preferably the number of bars in a set equals the number of dogs in a group.

The transmission system can be used in any vehicle for example, road cars, racing cars, lorries, motorcycles, bicycles, earth removal vehicles such as bulldozers, and military vehicles. The system can also be used in any machine that has first and second rotatable bodies wherein drive is to be transmitted from one of the rotatable bodies to the other, for example in lathes and milling machines.

It will also be appreciated by the skilled person that the transmission system can be adapted such that the selector assembly and the first and second gear wheels are mounted on the output shaft and the fixed gear wheels are mounted on the input shaft.

What is claimed is:

1. A transmission system comprising first and second rotatable shafts, said first shaft having a longitudinal axis, and means for transferring drive from one of the shafts to the other shaft comprising first and second gear wheels each rotatably mounted on the first shall and having drive formations formed thereon, a selector assembly for selectively transmitting torque between the first shaft and the first gear wheel and between the first shaft and the second gear wheel, wherein the selector assembly comprises an actuator assembly and first and second sets of engagement members, wherein each engagement member includes a first engagement face for engaging the first gear wheel, a second engagement face for engaging the second gear wheel, and a body that is substantially rigid such that the first and second engagement faces are arranged in a fixed relationship to one another, said actuator assembly including a shift fork assembly arranged to move each of the first and second sets of engagement members in first and second directions along the longitudinal axis of the first shaft into and out of engagement with the first and second gear wheels independently of each other, the arrangement being such that when one of the first and second gear wheels is selected by the first and second sets of engagement members backlash between the first and second sets of engagement members and the drive formations when moving between acceleration and deceleration is less than or equal to four degrees, and the transmission being further arranged such that when the first gear is selected by the first and second sets of engagement members and a driving force is transmitted the second set of engagement members drivingly engages the selected first gear wheel, and the first set of engagement members is then in an unloaded condition, wherein the shift fork assembly is arranged to move the unloaded first set of engagement members into driving engagement with the second gear wheel to effect a gear change.

2. A transmission system according to claim 1, wherein the selector assembly is arranged such that when the first gear wheel is engaged by the first and second sets of engagement members and a braking force is transmitted the first set of engagement members drivingly engages the engaged gear wheel, and the second set of engagement members is in an unloaded condition, and when a driving force is transmitted the second set of engagement members drivingly engages the engaged gear wheel, and the first set of engagement members is then in an unloaded condition.

3. A transmission system according to claim 1, wherein the actuator assembly is arranged to bias the loaded set of engagement members towards the unengaged gear wheel without disengaging the loaded set of engagement members from the engaged gear wheel.

4. A transmission system according to claim 1, wherein the first and second sets of engagement members are arranged to rotate, in use, with the first shaft.

5. A transmission system according to claim 1, wherein the first shaft is an input shaft and the second shaft is an output shaft and drive is transferred from the input shaft to the output shaft.

6. A transmission system according to claim 1, wherein the drive formations on the first and second gear wheels comprise first and second groups of dogs respectively.

7. A transmission system according to claim 6, wherein the first and second groups of dogs each comprise between two and eight dogs, evenly distributed on the first and second gears respectively.

8. A transmission system according to claim 7, wherein the first and second groups of dogs each comprise between two and four dogs, and preferably three dogs.

9. A transmission system according to claim 7, wherein the first and second groups of dogs each comprise three dogs.

10. A transmission system according to claim 1, wherein the first and second sets of engagement members comprise between two and eight members.

11. A transmission system according to claim 10, wherein the first and second sets of engagement members comprise between two and four members, and preferably three members.

12. A transmission system according to claim 10, wherein the first and second sets of engagement members comprise three members.

13. A transmission system according to claim 1, wherein the drive formations are arranged such that they do not extend beyond the outside diameter of the gear wheels.

14. A transmission system according to claim 1, wherein the transmission system includes at least one further shaft.

15. A method for performing a decelerating downshift in a transmission system, said method including:
providing a transmission system having first and second rotatable shafts, said first shaft having a longitudinal axis;
providing first and second gear trains for transferring drive from one of the shafts to the other shaft, the first gear train including a first gear wheel rotatably mounted on the first shaft and the second gear train includes a second ear wheel rotatably mounted on the first shaft said first and second gear wheels having drive formation formed thereon and said second year wheel being part of a higher gear than the first gear wheel;
selectively transmitting torque between the second gear wheel and the first shaft via a selector assembly including an actuator assembly having a shift fork assembly, and first and second sets of engagement members by
engaging the second gear wheel with the first set of engagement members such that each of the engagement members in the first set engages the second gear wheel with a first engagement face, and by
engaging the second gear wheel with the second set of engagement members such that each of the engagement members in the second set engages the second gear wheel with a first engagement face, and such that backlash between the first and second sets of engagement members and the drive formations when moving between acceleration and deceleration is less than or equal to four degrees, wherein each of the engagement members includes a body that is substantially rigid such that the first and second engagement faces are arranged in a fixed relationship to one another; and
starting from a position wherein the second set of engagement members drivingly engages the second gear wheel and the first set of engagement members is in an unloaded condition with respect to the second gear wheel, initially moving the unloaded first set of engagement members along the longitudinal axis of the first shaft by action of the fork assembly into engagement with the first gear wheel such that each of the engagement members in the first set engages the second gear wheel with a second engagement face, thereby transmitting torque between the first shaft and the first gear wheel to effect the gear change.

16. A method according to claim 15, including moving the second set of engagement members into engagement with the first gear wheel after the first set of engagement members engages the first gear wheel, such that each of the engagement members in the second set engages the second gear wheel with a second engagement face.

17. A method according to claim 15, wherein engaging the second gear wheel with the first and second sets of engagement members includes moving the first and second sets of engagement members in a first direction along the longitudinal axis of the first shaft into engagement with the second gear wheel by action of the shift fork assembly, and wherein moving the first set of engagement members into engagement with the first gear wheel includes moving the first set of engagement members in a second direction along the longitudinal axis of the first shaft into engagement with first gear wheel by action of the shift fork assembly.

18. A method according to claim 15, including providing the transmission system with at least one further shaft.

19. A method according to claim 15 wherein the shift fork assembly includes a shift fork and resilient means for connecting the first and second sets of engagement members to the shift fork, including moving the first and second sets of engagement members via the resilient means when the shift fork is actuated.

20. A method according to claim 19, including biasing the second set of engagement members towards the first gear wheel while it is drivingly engaged with the second gear.

21. A transmission system according to claim 1, wherein the first and second engagement faces each have a retention angle in the range of 2.5 to 15 degrees.

22. A transmission system according to claim 21, wherein the actuator assembly comprises at least one resiliently deformable means for connecting a shift fork to at least one of the first and second sets of engagement members, said at least one resiliently deformable means being arranged to move at least one of the first and second sets of engagement members into engagement with the first and second gear wheels in response to movement of the shift fork.

23. A transmission system according to claim 22, wherein the at least one resiliently deformable means is arranged to bias at least one of the first and second sets of engagement members towards the first or second gear wheel when the engagement members are drivingly engaged with a gear wheel.

24. A transmission system according to claim 22, wherein the actuator assembly comprises first and second resiliently deformable means connected to the first and second sets of engagement members respectively and to the shift fork such that the first resiliently deformable means acts on the first set of engagement members and the shift fork, and the second resiliently deformable means acts on the second set of engagement members and the shift fork.

25. A transmission system according to claim 22, wherein the at least one resiliently deformable means is connected to the first and second sets of engagement members such that the resiliently deformable means acts on both the first and second, sets of engagement members and the shift fork.

26. A transmission system according to claim 1, wherein the first shaft comprises keyways arranged such that the first and second sets of engagement members can slide axially along the keyways and to radially restrain the positions of the sets of engagement members.

27. A transmission system according to claim 26, wherein a cross-section of the keyways is one of T-shaped, slotted, and dovetailed.

28. A transmission system according to claim 26, wherein members of the first and/or second sets of engagement members can perform limited axial movement relative to each other in the keyways.

29. A transmission system according to any one of claims 22-28, wherein the resiliently deformable means includes a spring.

30. A transmission system according to claim 29, wherein the dice-spring comprises a disc spring having a plurality of arms, each arm having a first part that extends circumferentially around a portion of the disc spring and a second part that extends substantially radially inwards.

31. A transmission system according to claim 29, wherein the resiliently deformable means is a disc spring.

* * * * *